United States Patent [19]
Niblett

[11] Patent Number: 5,802,322
[45] Date of Patent: Sep. 1, 1998

[54] METHOD AND APPARATUS FOR THE SERIALIZATION OF UPDATES IN A DATA CONFERENCING NETWORK

[75] Inventor: Peter David Niblett, Whitchurch, United Kingdom

[73] Assignee: International Business Machines Corp., Armonk, N.Y.

[21] Appl. No.: 672,203

[22] Filed: Jun. 27, 1996

Related U.S. Application Data

[63] Continuation of PCT/GB95/01999, Aug. 23, 1995.

[30] Foreign Application Priority Data

Dec. 16, 1994 [GB] United Kingdom .................. 94254293

[51] Int. Cl.$^6$ ..................................................... G06F 15/16
[52] U.S. Cl. .................. 395/200.81; 395/200.76; 395/200.49
[58] Field of Search ................... 395/200.06, 200.04, 395/200.08, 200.02, 200.21, 330, 200.34, 200.37, 200.81; 340/825.05, 825.5; 370/452, 455, 420

[56] References Cited

U.S. PATENT DOCUMENTS

| | | | |
|---|---|---|---|
| 4,766,530 | 8/1988 | Roslund | 340/825.5 |
| 5,001,472 | 3/1991 | Fischer et al. | 340/825.5 |
| 5,206,934 | 4/1993 | Naef, III | 395/200.04 |
| 5,208,912 | 5/1993 | Nakayama et al. | 395/200.04 |
| 5,274,637 | 12/1993 | Sakamura et al. | 370/455 |
| 5,490,145 | 2/1996 | Tanabe et al. | 370/452 |

OTHER PUBLICATIONS

Ravindran et al., Communication Structures and Paradigms for Distributed Conferencing Application, Jun. 9–12, 1992, pp. 598–605.

Chang et al., A Counter–Based Reliable Broadcast Protocol, Sep. 5–8, 1994, pp. 396–403.

Rajagoplan et al., A Token–Based Protocol for Reliable, Ordered Multicast Communication, IEEE, pp. 84–93, Aug. 1989.

IEEE Transactions on Communications, vol. 39, No. 12, Dec. 1, 1991, pp. 1875–1885, XP 000268155, Vonderweidt G et al, "A Multipoint Communication Service for Interactive Applications".

Computer, vol. 18, No. 10, Oct. 1985, Long Beach, CA., pp. 33–45, "Computer–Based Real–Time Conferencing Systems" by S. Sarin.

'Fast Message Ordering and Membership Using a Logical Token–Passing Ring' by Amir et al, Proc of IEEE International Conference on Distributed Computing Systems, pp. 551–560, 1993.

Primary Examiner—Parshotam S. Lall
Assistant Examiner—Patrice L. Winder
Attorney, Agent, or Firm—Jeanine S. Ray-Yarletts

[57] ABSTRACT

A data conferencing network comprises multiple nodes linked together by a communications path. Each node has a copy of a shared data set, which is being updated by the users of the data conferencing network. Updates generated by a user at any particular node are added to a first queue at that node. A permit-token having an associated permit number circulates around all the nodes. When in possession of the permit token, a node can broadcast an update from its first queue. In doing so, it associates the current permit number with the update (to give an update level), and then increments the permit number by one before forwarding the permit token to the next node in its circulation route. Updates received at a node are placed into a second queue. Each receiving node maintains a current update level, representing the most recent update number applied to the shared data set at that node. The second queue is searched for the update having an update level, which exceeds the current update level by one unit. This update is then taken from the queue and applied to the shared data set, and the current update level is accordingly incremented by one unit.

7 Claims, 6 Drawing Sheets

METHOD AND APPARATUS FOR THE SERIALIZATION OF UPDATES IN A DATA CONFERENCING NETWORK

This is a continuation application of PCT/GB95/01999 dated Aug. 23, 1995.

The present invention relates to a data conferencing network and more specifically to a method and an apparatus for serialising operations performed at the nodes of such a network.

BACKGROUND OF THE INVENTION

A data conferencing network is a network which allows a plurality of users to interact and to exchange data with one another as if they were all sitting in the same conference room. This in a conference, each of the participants normally has the possibility of talking to all the other participants, to supply them with written texts and/or drawings, to draw a diagram on a board and to supplement or alter the information provided by other speakers on the same board.

In a similar way, a data conferencing network allows the exchange of information amongst participants remotely located with respect to one another. Each participant has a computer workstation (also called a node) and all the workstations are linked by appropriate communication media (e.g. modem, LAN, etc.) to form a communication network. Each workstation or node supports a collaborative-working application which allows the same data (text, drawing and the like) to be shared by all the participants as would be the case in a real-life conference environment. The participants can alter and modify this shared data as they wish simply by acting on their workstations, all the modifications being then supplied to the other participants. In this manner the situation of a real-life conference is simulated so that each participant can contribute to the subject debated at the conference, effectively drawing and/or modifying (updating) a diagram or the like on a board shared by all the participants.

Since at a given time, any one of the users can attempt to update the shared (underlying) data, a sequencing mechanism is required to ensure that these operations are reflected in the same order at all nodes in the network. This is to guarantee that each participant in the conference, i.e. each node, has the same version of the underlying data. In other words, the activities of the participants need to be serialised in order to avoid updates being applied in a different order at different nodes, and the nodes consequently getting out of step.

The following example will illustrate the kind of problems which may arise if the various update requests are not correctly sequenced. FIGS. 1A, 1B, and 1C illustrate two nodes A and B from a data conferencing network, each of which maintains its own copy of the conferencing data. In the present case the conferencing data is a shared chalkboard or image, comprising a house on the left and a car on the right. At commencement (FIG. 1A) both nodes A and B display exactly the same image.

Now suppose that each node is further adapted to edit the image. If this editing is performed naively, by simply allowing each node to update its own (local) copy of the data, and then supply information about the update to the other (remote) node in the network, with no restraints on the timing of the updates, then synchronisation difficulties can arise. For example, consider the result of the two editing operations depicted schematically beneath the images in FIG. 1A. Node A updates the image by swapping the left and right sides (resulting in swapping the positions of the car and the house), whilst node B updates the image by deleting the left hand portion (ie deleting the house). These operations are performed essentially immediately at the local node, leading to the situation in FIG. 1B, and each update is then transmitted to the remote node. However, when the updates arrive at the remote node, the relevant operations are performed on the version of the data that currently exists at that node. Thus when node B swaps the left and right portions of the screen, it simply moves the car from right to left, whilst when A deletes the left hand side, it actually deletes the car. As shown in FIG. 1C, this leads to the situation where B displays the car in the left-hand portion of the image, whilst A displays the house in the right-hand portion of the image. Clearly the two images are no longer the same, and the data sharing has broken down.

The problem arises because the effect of the updates is dependent on the order in which they are made (in mathematical terms, the update operations are non-commutative). In order to avoid this type of conflict it is thus of the utmost importance that the activities of the various nodes, and therefore all the update requests of the conferencing data, are properly sequenced.

This problem is discussed in "Beyond the Chalkboard: Computer Support for Collaboration and Problem Solving in Meetings", by M Stefik, G Foster, D Bobrow, K Kahn, S Lanning and L Suchman, in Communications of the ACM, pages 32–47, Volume 30, Number 1, January 1987. As described in this article, conventional data conferencing networks are normally designed in such a manner that one of the nodes of the network is designated as a central node, also called the master node. It is the responsibility of the master node to provide for the smooth operation of the data conferencing network by supplying the remaining nodes with all the relevant control data necessary for a proper serialisation of the activities across the network. Thus, typically, each update request from any node must first be sent to the master node which collects all the update requests from all the nodes and sequences them by determining the order in which they are to be effected. The master node then communicates to each of the peripheral nodes the updates, correctly sequenced. Note that one option is for the shared data to actually reside at the central node, and all updates to be applied there. All that the other nodes then receive are refreshes to their copies of the shared data from the central node.

This approach, although it successfully enforces serialisation amongst the various nodes of the network, has the major drawback that a considerable amount of additional dedicated control data is required to circulate on the network. Thus all the alterations of the underlying data effected by the various participants have to travel initially to the central node, before subsequently being distributed in order amongst all the nodes. Furthermore, an initial choice of a master node might become inappropriate at a later stage and require a reconfiguration of the whole network. For example, this could be the case in the event that the master node leaves the conference; alternatively, additional users may join the conference, thereby shifting the balance of the network such that the selected master node is inefficient (eg it might have a lower processor speed than some of the newly joined nodes, or only be connected by a slow communications link). As a consequence, conventional data conferencing networks are easily overburdened, and are liable to become rather slow and inefficient.

The above-mentioned reference describes various other approaches to serialisation, but these are generally found to be either slow (such as the locking technique, whereby before making an update a node requests a lock to the relevant data), or else unreliable, in that they are not capable of guaranteeing complete synchronisation. Thus the designer of a data conferencing network is faced with the problem that the prior art does not provide any completely satisfactory serialisation method.

BRIEF SUMMARY OF THE INVENTION

Accordingly, the invention provides a method for serialising updates to a shared data set in a data conferencing network, the network comprising multiple nodes, each node maintaining a copy of a shared data set, wherein update requests to the shared data set originating from any one node are transmitted to and performed by all the other nodes in the network, the method being characterised by the steps of:

defining a communication path that links all the nodes;

circulating a permit-token around said communication path, said permit-token having a permit number associated therewith;

placing each update request originating at a node in a first queue at said node;

receiving said permit-token at said node, assigning an update level to the update request in said first queue depending on the current value of said permit number, and incrementing said permit number;

forwarding the permit-token containing the incremented permit number to the next node in the communication path;

broadcasting the update request to all the nodes in the network;

receiving the update request at all the nodes in the network;

and at each receiving node:

placing the received update request in a second queue;

maintaining a current update level value reflecting the update level of the last update request to be applied to the shared data set at that receiving node;

and checking the update level of the update requests in the second queue against said current update level to determine whether the next update request to be applied is in the second queue, and if so, removing that update request from said second queue, updating the shared data set in accordance with the update, and incrementing the value of the current update level.

Thus a distributed approach is used based on the circulation around the network of a permit-token in which is embedded a permit number. The advantage of the distributed environment is that the new system is very flexible and that the network traffic is considerably reduced since there is no need for control messages travelling to and from a master node. The network does not require the definition of a central node, responsibility for the actual control of the network being shared amongst all the nodes, and new nodes can join and/or leave the network at any time without any reconfiguration.

Typically, at the beginning of each conference, the permit number associated with the permit-token is set to an initial value, the value being known to all the nodes in the network. This value is then progressively incremented each time an update is generated, as the permit-token circulates around the network.

In a preferred embodiment, the method further comprises the step of sorting said update requests in said second queue by their update level. The ordering of the second queue allows very quick checking of the queue to see if the next update having the correct update level has arrived.

In order to ensure an effective management of the update requests, it is important that the permit-token is kept circulating quickly around the network and that it is not held up too long in any node. This might happen if a very large update request required considerable processing time within the node or transmission time over the network. This difficulty can be avoided if prior to being placed on said first queue, any updates greater than a predetermined size are divided into a plurality of update requests.

Thus the large update request is broken into a series of smaller sub-requests which are processed in sequence. As a result, the permit-token is not held up excessively whilst waiting for the whole update to be processed, but can instead be passed on to the next node immediately after the processing of the first sub-request of the chain. The remaining sub-requests are then sent one at a time, each time the permit-token returns to that node.

Another efficiency aspect relates to the actual network configuration. The path linking the various nodes may have to pass through a certain node more than once in order for all the nodes of the network to be reached. As a consequence this node in the network will see the permit-token more often than the others and therefore get a higher chance to transmit its update requests. This situation can be avoided by ensuring that each node is allowed to utilise the permit-token only once per circulation around the communication path, regardless of how many times the node actually receives it. This would re-balance the transmission chances of the different nodes, granting each node an approximately equal chance of being able to transmit its own update requests.

The invention also provides apparatus for serialising updates to a shared data set in a data conferencing network, the network comprising multiple nodes, wherein a communication path is defined that links all the nodes, each node maintaining a copy of a shared data set, wherein update requests to the shared data set originating from any one node are transmitted to and performed by all the other nodes in the network, the apparatus at one node including:

means for circulating a permit-token around said communication path, said permit-token having a permit number associated therewith;

a first queue for storing each update request originating at that node;

means for receiving said permit-token at that node, for assigning an update level to the update request in said first queue dependent on the current value of said permit number, and for for incrementing said permit number;

means for forwarding the permit-token containing the incremented permit number to the next node in the communication path;

means for broadcasting the update request to all the nodes in the network;

means for receiving an update request from another node in the network;

a second queue for storing the received update request;

means for maintaining a current update level value reflecting the update level of the last update request to be applied to the shared data set at that node;

and means for checking the update level of the update requests in the second queue against said current update level to determine whether the next update request to be applied is in the second queue, and if so, removing that update request from said second queue, updating the shared data set in accordance with the update, and incrementing the value of the current update level.

BRIEF DESCRIPTION OF THE DRAWINGS

An embodiment of the invention will now be described in detail by way of example only, with reference to the following drawings.

DETAILED DESCRIPTION OF THE INVENTION

Figure 2:
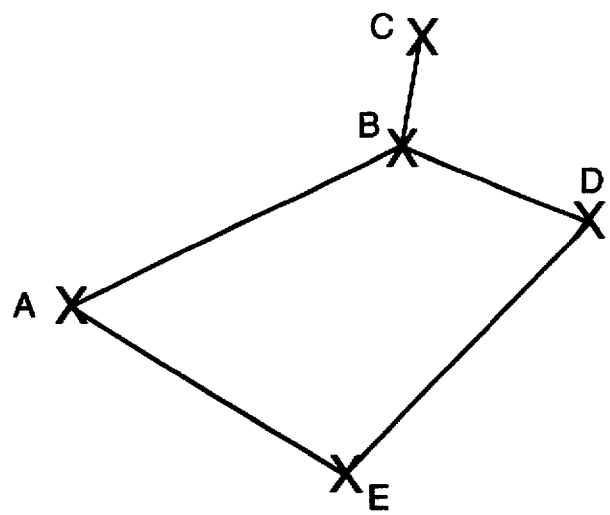
FIG. 2 is a schematic diagram of a data conferencing network.

FIG. 2 is a simple schematic representation of a data conferencing network comprising five nodes, A, B, C, D and E. The network may be homogeneous (ie all the links of the same format), or the type of link may vary across the network (eg ISDN connections, LAN connections etc). It will be understood that for present purposes "data conferencing network" implies those nodes which are participating in the conference, whether or not they are spread across multiple physical networks, and does not include those nodes which although they are perhaps physically connected to one of the nodes shown (for example by a LAN connection), are not actually participating in the data conference. It will also be noted that some known data conferencing networks are dynamic, in that nodes can join and leave the conference whilst it is in progress.

Figure 3:
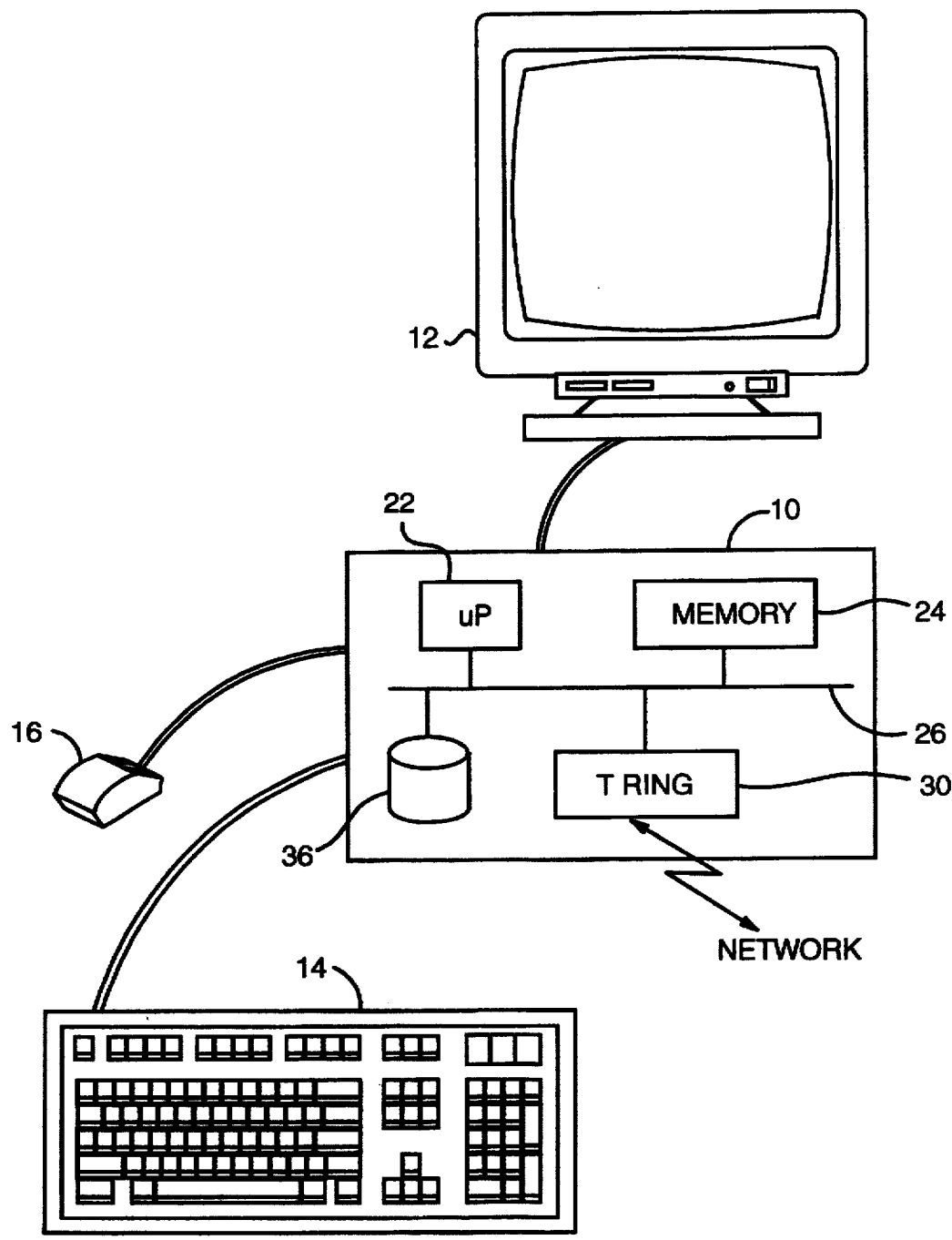
FIG. 3 is a simple block diagram of a computer workstation that typically forms a node in the data conferencing network of FIG. 2.

Each node in the network typically comprises a computer workstation as shown schematically in FIG. 3. The computer workstation comprises a system unit 10, a display screen 12, a keyboard 14 and a mouse 16. The system unit 10 includes microprocessor 22, semi-conductor memory (ROM/RAM) 24, a hard disk drive unit 36, and a bus over which data is transferred 26. The computer of FIG. 3 may be any conventional workstation, such as a PS/2 computer available from IBM Corporation, and may well include further devices, such as a CD-ROM or floppy disk drive, not illustrated. The computer of FIG. 3 is also equipped with a network adapter card 30. This card, together with the accompanying software, allows messages to be transmitted from and received by the computer workstation over the network shown in FIG. 2. Various forms of network adapter card are available for use with different types of network, such as Token Ring or Ethernet (both forms of LAN), ISDN, and so on. The operation of the network adapter card is well-known and so will not be described in detail. It should be noted that it is quite possible for the computer workstation of FIG. 3 to have more than one network adapter card, to allow the workstation to communicate across multiple physical networks.

Figure 4:
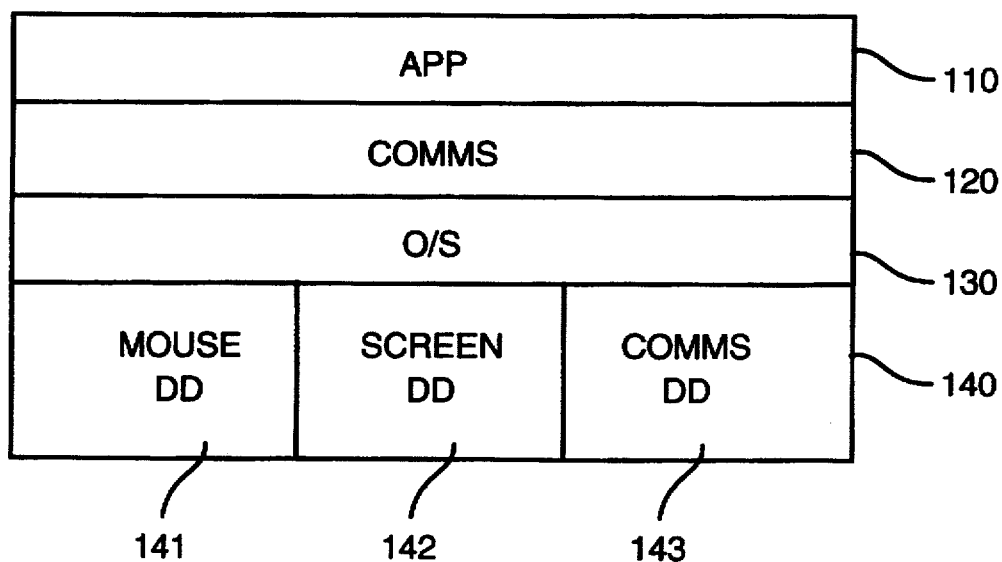
FIG. 4 is a simple block diagram of the main software components running on the computer workstation of FIG. 3.

FIG. 4 depicts the main software components on the workstation of FIG. 3. The workstation has an operating system 130 such as the OS/2 operating system available from IBM, which supports communications software 120. This communications software allows messages to be exchanged between the different nodes of the data conferencing network of FIG. 2. Such communications software is well-known an the art, and so will not be described further. Sitting on top of the communications software is an application 110, which is responsible for providing the shared editing facility, and is described in more detail below. Finally, FIG. 4 also depicts a set of device drivers 140, which are used by the operating system to communicate with external devices. FIG. 4 depicts a mouse device driver 141 for receiving user commands from the mouse, a screen device driver 142 for allowing data to be displayed on the computer screen, and a communications device driver 143 which allows data to be transmitted over the communications network. Again, device drivers are well-known in the art, and so will not be described further. It will also be readily appreciated that there may well be other device drivers which are not shown, since they are not directly relevant for an understanding of the present invention.

Figure 5:
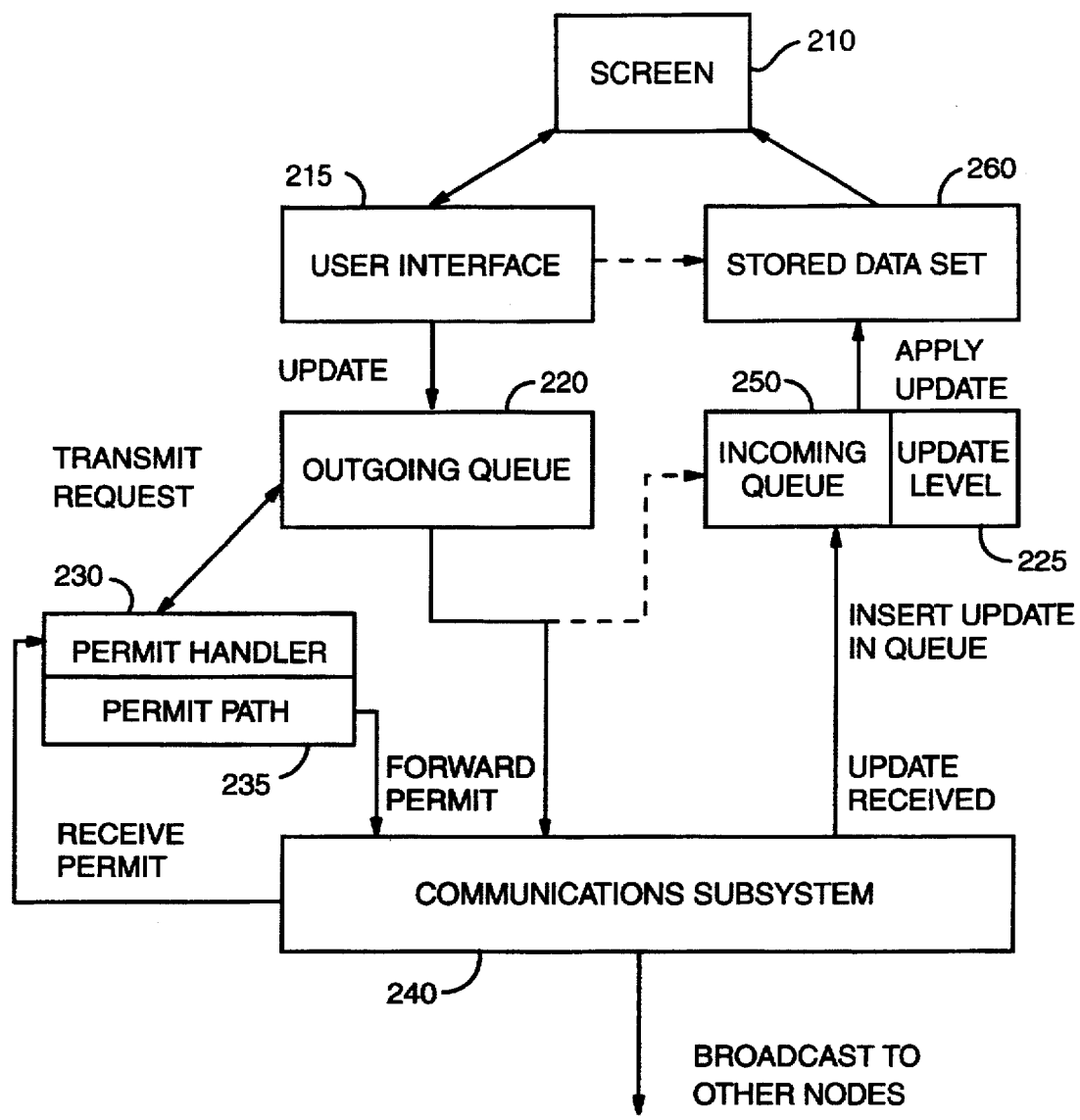
FIG. 5 is a more detailed diagram of the software components used to in a preferred embodiment of the invention.

FIG. 5 illustrates in more detail the main components at a workstation which can be used to implement the present invention, and gives an indication of the data flow between these components. There is a stored data set 260, which contains the actual shared data which is being edited. This is typically stored either on the hard disk 36 or in the RAM 24 of the computer workstation of FIG. 3. The stored data is displayed in known fashion on the screen 210 (corresponding to the screen 12 in FIG. 3). A user interface 215 is provided, which allows the user to enter editing actions with respect to the stored data, typically using a mouse 16 and/or keyboard 14. Again, mechanisms for providing such a user interface, and for accepting a user update are well-known. Note that there are no restrictions on the updates that a user can perform (eg it is not necessary for the user to first request a lock to a particular object on the screen).

When an update is received from a user, instead of being applied immediately to the stored data set 260, it is placed in an outgoing queue 220. The operation of the queue is governed by a permit-token which circulates around the data conferencing network. Thus periodically the permit-token is received at this node, and is passed from the communications subsystem 240 (corresponding to the communications software 120 in FIG. 4) to a permit handler 230. The permit-token contains a number (called the permit number). When the permit handler receives the permit-token, it checks to see if there are any updates currently in the outgoing queue. If so, the permit handler notes the permit number, and then increments it by one unit. The permit-token is then returned to the communications subsystem, from where it is returned into circulation and forwarded to the next node in its path. The permit handler then passes the permit number (ie the one noted prior to the incrementing) to the queue, which associates it with the first update in the queue (which is FIFO); this effectively assigns an update level to the update. The update is then removed from the outgoing queue and passed to the communications subsystem, together with its update level, and is then broadcast to the other nodes in the network.

Considering now the receipt of updates (together with their update level), these arrive at the communications subsystem 240 and are passed up to an incoming queue 250. Note that depending on how the broadcast function is implemented, updates generated locally at that node may be passed directly from the outgoing queue to the incoming queue without entering the communications subsystem. The received updates are placed in the incoming queue in order of their update level. Each node maintains a record of the current update level 255. The update level at the head of the incoming queue (ie the update having the lowest update level) is then compared with the current update level. This comparison is performed each time an update arrives, although it could be performed asynchronously with respect to update arrivals (eg on some periodic basis). If the update level of the update at the head of the queue exceeds the current update level by just one unit, then it must represent the next update to be performed. This update is therefore removed from the queue and applied to the stored data set 240, and the screen 210 can then be updated accordingly. Also, the current update level is incremented by one unit.

Thus each update generated in the data conferencing network is assigned a unique update level, derived from the permit number of the permit-token, and each node in the network applies the updates to the stored data in order of their update level. Thus correct serialisation of the updates throughout the network is guaranteed, thereby ensuring that each node maintains an equivalent copy of the shared data set.

Figure 1:
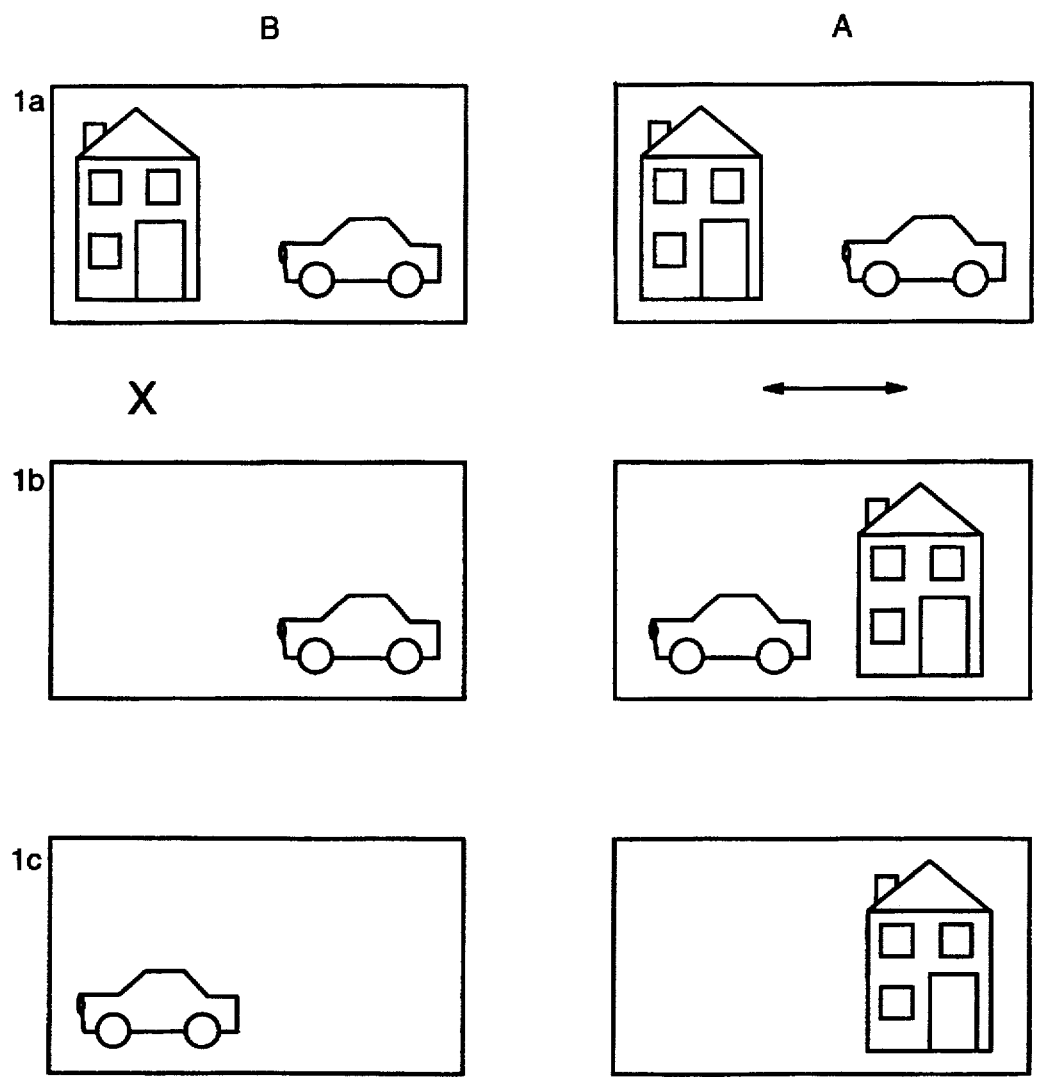
FIGS. 1A, 1B and 1C are a simple illustration of the problems which can occur if updates are not properly serialised.

For example, returning to the situation of FIGS. 1A, 1B and 1C, again suppose that A and B perform the operations indicated. This time, both nodes will perform the two operations in the same order, depending on who received the permit-token first. Assuming for example, that A received the permit-token first, the swapping operation will have a lower update level than the deletion operation. The deletion operation is likely to arrive at B's incoming queue first (since it is generated locally), but because there will be a gap between its update level and the current update level at B, it will not be applied until after the swapping operation arrives at B and is duly applied. As a result, both A and B apply the two operations in the same order, and end up with the same stored data set (ie the one shown for A).

Note that if A's operation is performed first, then the effect of B's operation may not in fact reflect B's intended editing operation (B presumably wants to delete the house not the car). However, this is a less serious problem than loss of synchronisation between the data sets, and can be mitigated for example by greying out objects that are currently being edited (see the above-mentioned paper by Stefik et al.).

Figure 6:
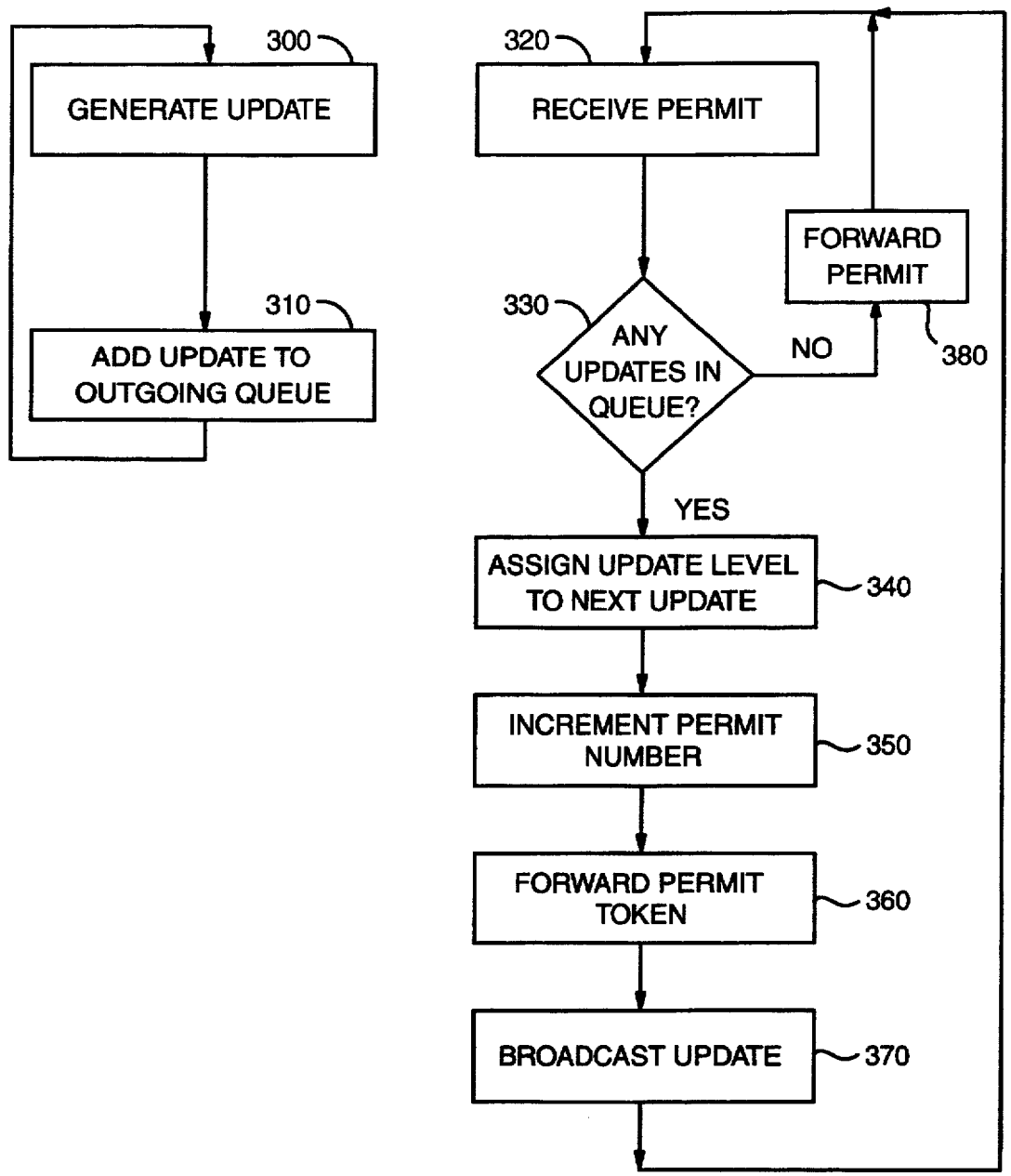
FIG. 6 is a flow diagram representing the outward processing of updates in accordance with the present invention.

The flow chart of FIG. 6 illustrates the outward processing of updates at a node. These are generated (step 300) at the node and added to the outgoing queue at that node (310), which is a FIFO queue. Asynchronously with the generation of updates, the permit-token is periodically received at the node (step 330), and the outgoing queue is examined (330). If the outgoing queue is empty, then the permit is simply forwarded on to the next node in its circulation path (step 380). However, if there is at least one update in the outgoing queue, then the update at the head of the queue is removed from the queue, and assigned an update level equal to the current permit number of the permit-token (step 340). The permit number of the permit-token is then incremented by one unit (step 350), and the permit number is forwarded on to the next node in its communication path (step 360). Finally, the update (including its assigned update level) is broadcast to all the nodes in the data conferencing network (step 370). Thus one update can be output by a node per receipt of the token.

Figure 7:
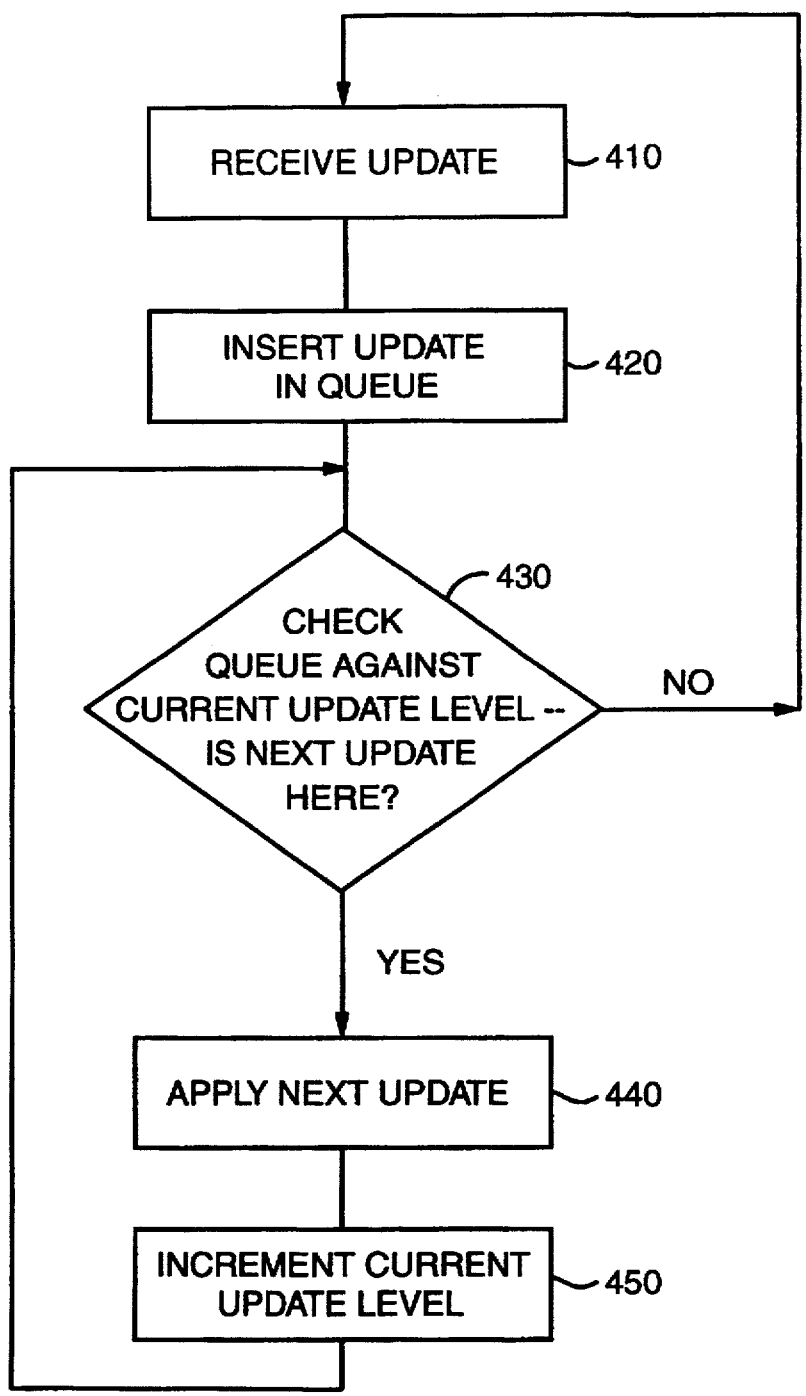
FIG. 7 is a flow diagram representing the inward processing of updates in accordance with the present invention.

The inward processing by a node of an update is shown in FIG. 7. An update is received (either from elsewhere in the network or from that node itself) (step 410), and it is inserted into the incoming queue (step 420). The incoming queue is ordered in terms of update level, and each update is inserted at its correct position in the queue. The lowest (earliest) update level in the queue is then compared against the current update level for that machine (step 430). If there is a difference of just a single unit, then the update having the lowest update level is the next update to apply to the stored data set; if not, the next update has not arrived, and the process must return to the start to await the arrival of a following update. Assuming that there is a difference of just one unit, then the relevant update is removed from the incoming queue and applied to the stored data (step 440), and the current update level is incremented by one unit (step 450).

It will be understood of course that although the permit number has been described as being incremented by one unit, it would equally be possible for the permit number to count downwards, to go up by two units each time etc. The only requirement is that there is an ordering imposed on the permit numbers, so that each node can correctly determine the next permit number when it wants to make an update. Similarly, the precise manner in which an update is endorsed by the permit number is not important. For example, if a permit arrives with a permit number of 16, depending on the implementation, the update may be endorsed with either 16 (the incoming permit number), or 17, (the outgoing permit number), or indeed some other function of the permit number. Again, the only requirement is that each node can properly order or sequence the received updates, including the ability to detect whether or not there are any updates missing from the sequence, and that there is consistency across the network.

It is important for the permit to be circulated quickly around the network, so that updates can be performed promptly. Since the permit-token is so small (typically just a number, plus usual message header information, such as the identity of the sending and recipient nodes) it is easy to circulate the permit-token quickly. One precaution that can be taken is to impose a maximum size on any single update that can be transmitted on the network. Thus large updates have to be broken down into smaller updates before being added to the outgoing queue. This helps to avoid undue delays to the permit-token whilst very large messages are being transmitted on the network.

It is necessary to define a route for the permit-token that includes every node in the data conferencing network. Thus a possible route for the network of FIG. 2 would be A-B-C-B-D-E-A. Note that it is not necessary for any node to know the entire route; all that is required is for a node to know which node it should forward the permit-token on to (this will possibly be dependent on which node the permit-token was received from, as in the above case for node B). This information is schematically illustrated in FIG. 5 by the permit path component 235 of the permit handler. Nodes can dynamically join and leave the network using standard procedures (eg informing their neighbours so that they can update their permit path information accordingly).

It will be noticed that in the route suggested above for the data conferencing network of FIG. 2, B gets the permit twice per circulation, and so in theory could perform updates twice as frequently as other nodes in the network. If so desired, this bias can be eliminated by allowing any particular node to make updates only once per circulation path. For example, node B might be allowed to make an update when it has received the permit-token from node A, but not when it has received the permit-token from node C.

The initial value of the permit number (ie corresponding to the first update to be made) can be set to a predetermined number (eg zero) or selected by one node at the start of the data conference. The other nodes in the network do not explicitly need to know this original permit number what they do need to know however is the value at which to initially set the current update level. If the permit number is set to a value known to all the nodes in the network, then each node can set its initial current update level to one less than this. Another possibility is that once a node has selected the initial permit number, it broadcasts a suitable initial current update level to the other nodes in the network.

A simple scheme to allow new members to dynamically join the data conferencing network is for each joining node to attach via a preexisting node. The preexisting node waits until it has the permit-token, then compares the permit number with its own current update level. The preexisting node then supplies the joining rode with its own copy of the stored data, and broadcasts a request for a copy of all intervening updates having an update level between the current update level for that node and the permit number to be sent to the joining node. Another possibility would be for the preexisting node itself to pass on all intervening updates to the newly joined node.

One possible problem concerns the loss of updates in the network. Generally such loss is unlikely in modern networks, but if a node finds that it has a large number of updates in its incoming queue, but is being held up waiting for one particular update, it could broadcast a message asking for that particular update to be resent. Note however that if there is significant loss of messages in the network, then shared editing is inadvisable whichever method of serialisation is adopted.

Typically the permit is a 32 bit number, with all increments being performed modulo-32. The permit helps serialise the updates. Note that unlike the token which circulates in a Token Ring LAN, the permit-token cannot be converted into a data frame.

One possible enhancement to the approach described above would be the addition of an echo feature, whereby an update made by a user at a node is temporarily applied at that node in order to give the user some feedback before the permit is received. However, it must be able to back out of the temporary update if it turns out not to be the next update in sequence.

I claim:

1. A method for serializing updates to shared data in a data conferencing network between a plurality of computer workstations each constituting a node with each node possessing a copy of said shared data, wherein update requests to the shared data originating from any one node are transmitted to and performed by all the other nodes in said network, said method comprising the steps of:

defining a communication path that links all the nodes in a given sequence relative to one another;

circulating a permit-token around said communication path, said permit-token having a permit number associated therewith, wherein there is a single permit number shared between all the nodes in the network;

placing each update request originating at a node in a first queue at said node;

receiving said permit-token at said node, assigning an update level to the update request in said first queue dependent on the current value of said permit number, and incrementing said permit number;

forwarding the permit-token containing the incremented permit number to the next sequential node in said defined communication path;

broadcasting the update request to which the update level was assigned to all the nodes in the network;

receiving the update request at all the nodes in the network;

placing the received update request at each receiving node in a second queue;

maintaining a current update level value reflecting the update level of the last update request to be applied to the shared data set at that receiving node; and checking the update level of the update requests in the second queue against said current update level to determine whether the next update request to be applied is in the second queue, and if so, removing that update request from said second queue, updating the shared data in accordance with the update, and incrementing the value of the current update level.

2. a method as claimed in claim 1, further including the step of setting the permit number to an initial value at the start of the conference.

3. A method as claimed in claim 2 further comprising the step of sorting the update requests in said second queue by their update level.

4. A method as claimed in claim 2 where, prior to being placed on said first queue, an update greater than a predetermined size is divided into a plurality of update requests.

5. A method as claimed in claim 3 wherein each node is allowed to utilize the permit-token only once per circulation around the communication path.

6. A method as claimed in claim 1 wherein each node is allowed to utilize the permit-token only once per circulation around the communication path.

7. Apparatus for serializing updates to shared data in a data conferencing network between a plurality of computer workstations, interconnected via a common communication path, with each workstation constituting a node and with each node possessing a copy of said shared data, wherein update requests to the shared data originating from any one node are transmitted to and performed by all the other nodes in said network, said apparatus comprising:

means for circulating a permit-token around said communication path in a given sequence, said permit-token having a permit number associated therewith, wherein there is a single permit number shared between all the nodes in the network;

a first queue for storing each update request originating at that node;

means for receiving said permit-token at that node, for assigning an update level to the update request in said first queue dependent on the current value of said permit number, and for incrementing said permit number;

means for forwarding the permit-token containing the incremented permit number to the next sequential node in said communication path;

means for broadcasting the update request to which the update level was assigned to all the nodes in the network;

means for receiving an update request from another node in the network;

a second queue for storing received the update request;

means for maintaining a current update level value reflecting the update level of the last update request to be applied to the shared data at that node; and means for checking the update level of the update requests in the second queue against said current update level to determine whether the next update request to be applied is in the second queue, and if so, removing that update request from said second queue, updating the shared data in accordance with the update, and incrementing the value of the current update level.

* * * * *